United States Patent
Neubauer et al.

(10) Patent No.: US 7,623,598 B2
(45) Date of Patent: Nov. 24, 2009

(54) DEMODULATION OF A FREQUENCY-MODULATED RECEIVED SIGNAL BY MEANS OF A VITERBI ALGORITHM

(75) Inventors: André Neubauer, Krefeld (DE); Jürgen Niederholz, Kerken (DE)

(73) Assignee: Infineon Technologies AG, Neubiberg (DE)

( * ) Notice: Subject to any disclaimer, the term of this patent is extended or adjusted under 35 U.S.C. 154(b) by 649 days.

(21) Appl. No.: 11/057,554

(22) Filed: Feb. 14, 2005

(65) Prior Publication Data

US 2005/0190860 A1 Sep. 1, 2005

Related U.S. Application Data

(63) Continuation of application No. PCT/DE2003/002543, filed on Jul. 29, 2003.

(30) Foreign Application Priority Data

Aug. 19, 2002 (DE) ................. 102 37 867

(51) Int. Cl.
*H04L 27/14* (2006.01)
(52) U.S. Cl. ...................... 375/341; 375/262
(58) Field of Classification Search ............ 375/340
See application file for complete search history.

(56) References Cited

U.S. PATENT DOCUMENTS

| | | | | |
|---|---|---|---|---|
| 4,755,774 A | * | 7/1988 | Heck | 332/123 |
| 5,077,728 A | * | 12/1991 | Kaminow | 398/89 |
| 5,329,242 A | * | 7/1994 | Myers | 329/300 |
| 5,784,416 A | | 7/1998 | Yang et al. | 375/341 |
| 6,108,374 A | * | 8/2000 | Balachandran et al. | 375/227 |
| 2002/0085520 A1 | * | 7/2002 | Sydon et al. | 370/335 |
| 2003/0088390 A1 | * | 5/2003 | Jamsa et al. | 703/5 |
| 2004/0029599 A1 | | 2/2004 | Mehrgardt et al. | 455/466 |

FOREIGN PATENT DOCUMENTS

| | | |
|---|---|---|
| DE | 10103479 A1 | 8/2002 |
| WO | 01/13524 | 2/2001 |

(Continued)

OTHER PUBLICATIONS

PCT International Search Report Application No. PCT/DE03/02543, 3 pages (English), Mailed Dec. 4, 2003.

(Continued)

*Primary Examiner*—Shuwang Liu
*Assistant Examiner*—David Huang
(74) *Attorney, Agent, or Firm*—Dicke, Billig & Czaja, PLLC

(57) ABSTRACT

Apparatus for demodulation of a signal which is frequency-modulated with a data symbol sequence $\{d_k\}$, having a zero crossing detector (1), a generator (2) for production of a sequence $\{z_i\}$, with $z_i$ being calculated from zero crossings $t_i$ and $t_{i+1}$, and having a unit (3) for reconstruction of the data symbol sequence $\{d_k\}$, which is characterized by a minimum Euclidean distance between the sequence $\{z_i\}$ and an auxiliary sequence, with each sequence element in the auxiliary sequence being formed from convolution of the data symbol sequence $\{d_k\}$ with a sequence $\{h_{i,k}\}$ relating to the index k, and with the sequences $\{h_{i,k}\}$ being functions of the times $t_i$ and $t_{i+1}$.

9 Claims, 2 Drawing Sheets

FOREIGN PATENT DOCUMENTS

WO    01/13524 A1    2/2001

OTHER PUBLICATIONS

"Error Performance Analysis for Narrow-Band Duobinary FM with Discriminator Detection and Soft Decision Decoding," by T.T. Tjhung, et al.; IEE Transactions on Communications, vol. 37, No. 11, pp. 1222-1228, Nov. 1989.

"Sequence Estimation Using Viterbi Algorithm for Improving Bit Error Rate of Binary Continuous Phase FSK with Limiter Discriminator and Integrate & Dump Filter Detection," by Y. Iwanami, et al., Dept. of Electrical and Computer Engineering, Nagoya Institute of Technology, Nagoya-shi, 466, Japan, Conference Singapore ICCS/ISITA, pp. 122-126, 1992.

"Performance of Sequence Estimation Scheme of Narrowband Digital FM Signals with Limiter-Discrminator Detection," by Iwanami Yasunori; IEEE Journal on Selected Areas in Communications, vol. 13, No. 2, pp. 310-315, Feb. 1995.

"Low-Power Design of a DIgital FM Demodulator Based on Zero-Cross Detection at IF" by N. Ismailoglu et al.; IEEE Vehicular Technology Conference, New York, US, vol. 2, conf. 50, pp. 810-813., Sep. 19-22, 1999.

Ismailoglu, et al., Low-Power Design of a Digital FM Demodulator Based on zer-Cross Detection at if, XP-000924622, IEEE, pp. 810-813, 1999.

Iwanami, et al., *Sequence Estimation Scheme Using Viterbi Alorithm for Improving bit Error Rate of Binary Continuous Phase FSK with Limiter Discriminator and Integrate & Dump Filter Detection*, Department of Electrical and Computer Engineering Nagoya Institute of Technology, Nagoya-shi, 466 Japan, 1992.

PCT Search Report for PCT/DE03/02543, Dec. 04, 2003.

Tjhung, et al., *Error Performance Analysis for Narro-Band Duobinary FM with Discriminatior Detection and Soft Decision Decoding*, IEEE Transactions on Communications, vol. 37, No. 11, pp. 1222-1228, Nov. 1989.

Yasunori Iwanami, *Performance of Sequence Estimation Scheme of Narrowband Digital FM Signals with Limiter-Discriminator Detection*, Jrnl on Slected Areas in Communications, vol. 13, No. 2, pp. 310-315, Feb. 1995.

\* cited by examiner

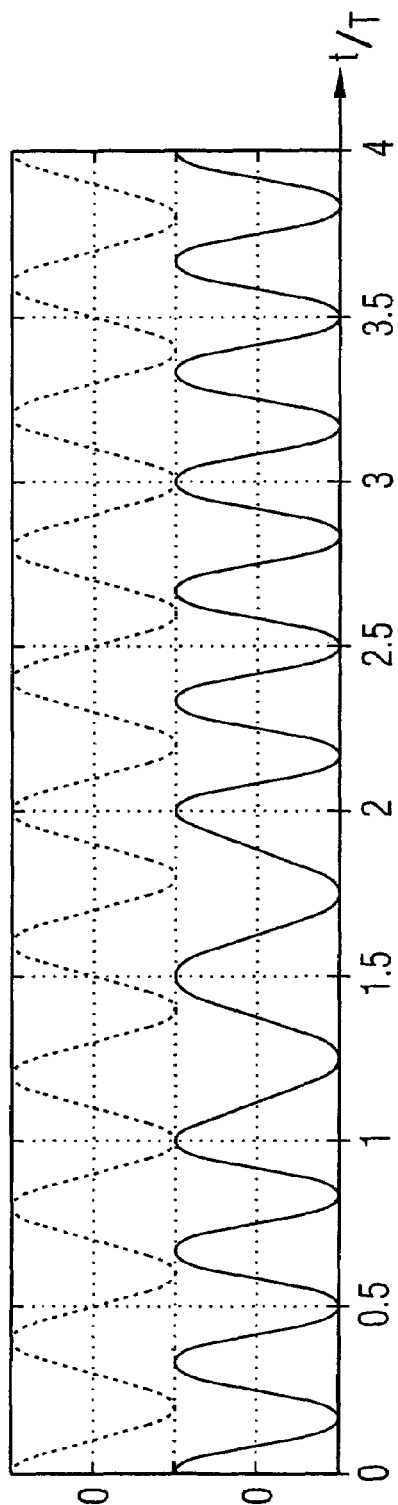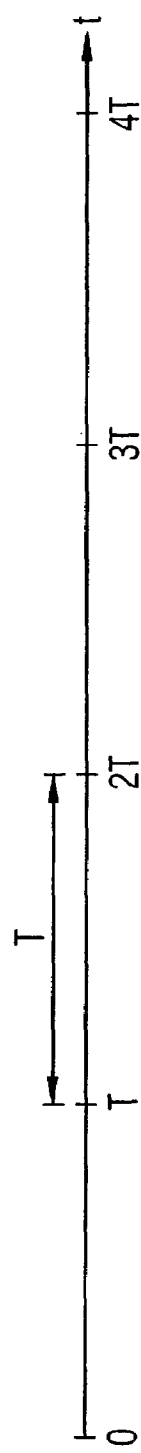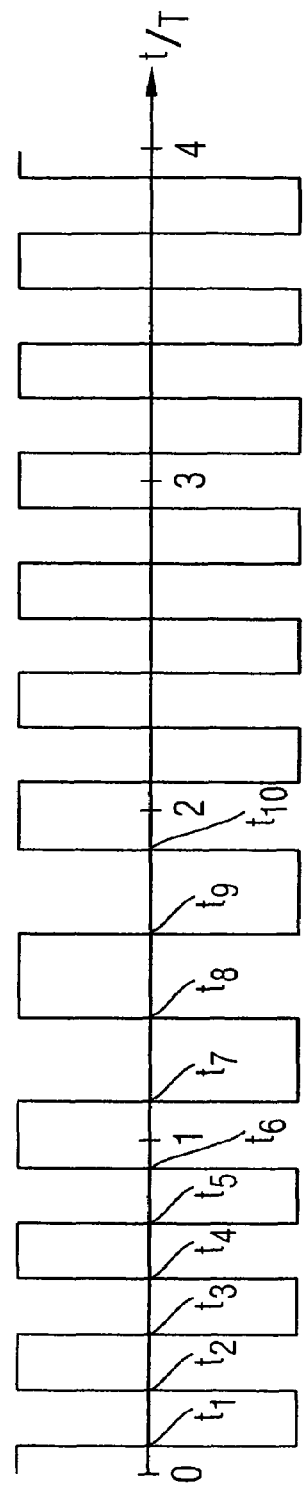

DEMODULATION OF A FREQUENCY-MODULATED RECEIVED SIGNAL BY MEANS OF A VITERBI ALGORITHM

CROSS-REFERENCE TO RELATED APPLICATION OR PRIORITY

This application is a continuation of co-pending International Application No. PCT/DE2003/002543 filed Jul. 29, 2003 which designates the United States, and claims priority to German application number DE10237867.3 filed Aug. 19, 2002.

FIELD OF THE INVENTION

The invention relates to an apparatus and a method for demodulation of an analog received signal which is transmitted by a radio and was frequency-modulated at the transmitter end with a data symbol sequence.

BACKGROUND OF THE INVENTION

The apparatus and the method to which the invention relates are preferably components of cordless digital communications systems, which are based on the BLUETOOTH ™ wireless technology Standard, the DECT Standard, WDCT Standard or a similar Standard.

In communications systems such as these, traditional signal processing methods are used at the receiver end for demodulation of the frequency-modulated received signal and for signal detection. One method which is often used is based on the so called limiter discriminator FM demodulator, in which the frequency-modulated signal is demodulated, for example by means of an analog coincidence demodulator, with corresponding signal detection, after hard limiting of the generally complex bandpass signal.

Furthermore, receiver concepts are known in which the intermediate frequency signal is converted to the digital domain by means of an analog/digital converter, and the signal detection is carried out using digital signal processing methods. One such method is described, by way of example, in the document DE 101 03 479.2. Methods such as these admittedly allow high quality signal detection to be achieved, but they have the disadvantage of a complex analog/digital converter.

SUMMARY OF THE INVENTION

The object of the invention is thus to specify an apparatus and a method for demodulation of a digitally frequency-modulated received signal, by means of which high performance can be achieved with a low level of implementation complexity at the same time.

The apparatus according to the invention is used for demodulation of an analog received signal which has been frequency-modulated at the transmitter end with a data symbol sequence $\{d_k\}$. For this purpose, the apparatus has a detector for zero crossings, a sequence generator and a calculation unit. The detector is used to detect the zero crossings in the received signal. The sequence generator produces a sequence $\{z_i\}$ from the times associated with the zero crossings. Two successive zero crossings are respectively in each case processed such that the difference $t_{i+1}-t_i$ between the associated times $t_i$ and $t_{i+1}$ is formed, and a sequence element $z_i$ in the sequence $\{z_i\}$ is calculated from the difference $t_{i+1}-t_i$. The object of the calculation unit is to reconstruct the data symbol sequence $\{d_k\}$. In this case, the sought data symbol sequence $\{d_k\}$ must be selected from the possible data symbol sequences. One sequence can in each case be calculated by means of coefficients $h_{i,k}$ from each of the possible data symbol sequences. The sought data symbol sequence $\{d_k\}$ is distinguished by the sequence that is calculated from it being at the minimum Euclidean distance from the sequence $\{z_i\}$ in comparison to the other calculated sequences. The sequence elements in a calculated sequence are obtained from convolution of the respective data symbol sequence $\{d_k\}$ with the coefficient sequence $\{h_{i,k}\}$ for the index k. This means that the index i for the coefficient sequence $\{h_{i,k}\}$ is fixed for the calculation of a sequence element in the calculated sequence. In order to calculate the next sequence element, the index i is incremented. The coefficient sequences $\{h_{i,k}\}$ are obtained from the times $t_i$ and $t_{i+1}$. The sequential indexes i and k may, by way of example, extend over natural numbers.

In comparison to conventional apparatuses that are used for the same purpose, the apparatus according to the invention is advantageous since it allows the frequency-modulated received signal to be demodulated particularly reliably and with particularly little effort.

The minimization task which has been described above and which must be carried out in the calculation unit can be carried out particularly advantageously by means of a Viterbi algorithm. A description of the Viterbi algorithm can be found, by way of example, in the document WO 01/13524 A1.

A filter may advantageously be the basis for a model of the frequency modulation of the analog received signal. A filter convolves an input variable with filter coefficients and thus produces an output variable. In the frequency-modulation model, the input side of the filter is fed with the data symbol sequence $\{d_k\}$. The data symbol sequence $\{d_k\}$ is convolved with the coefficient sequences $\{h_{i,k}\}$ in the filter. The sequence $\{z_i\}$ is emitted on the output side of the filter as the result of the convolution operations. The coefficient sequences $\{h_{i,k}\}$ are specified for the filter, in order to allow the convolution operations to be carried out.

One particularly preferred refinement of the invention provides for the minimization task that has to be carried out in the calculation unit to be carried out by means of a modified Viterbi algorithm.

Conventional fields of use for the Viterbi algorithms are the equalization of a received signal which has been distorted by multipath interference during transmission, and the decoding of a channel coded received signal. During the processing of the Viterbi algorithm, recursive means are used to determine the so called shortest path through a state diagram which, for example, reflects the decoding rule and is referred to as the trellis diagram. In the case of decoding, the process of determination of this shortest path through the trellis diagram is equivalent to the reconstruction of the data symbol sequence which was supplied to the coder at the transmitter end.

In the present case, it is intended to use the Viterbi algorithm in order to reconstruct the data symbol sequence $\{d_k\}$ from the measured sequence $\{z_i\}$. Since this is done using the filter model described above as the basis, the nodes in the trellis diagram in this case represent the filter states.

However, the application of the Viterbi algorithm to the filter model results in a difficulty. When the Viterbi algorithm is used in the conventional way, the number of steps carried out per data symbol is constant and this number is generally equal to the ratio of the sample rate to the symbol rate. In the present case, the measured values from which the data symbol sequence $\{d_k\}$ is intended to be reconstructed are the times of the zero crossings in the received signal. However, the frequency modulation means that the zero crossings do not result in an equidistant sequence. Furthermore, the frequency of the zero crossings depends on the data symbols $d_k$. In consequence, the Viterbi algorithm must be appropriately modified.

The trellis diagram that is used in the present case provides for the nodes to represent the filter states and for nodes which are located vertically one above the other to relate to the same symbol clock cycle boundary. This means that the states which are represented by the nodes differ in the horizontal direction by a discrete time, specifically the symbol time period, which is used to define the symbol clock rate.

The processing of a conventional Viterbi algorithm comprises essentially three computation procedures per time step: the calculation of the branch metric values in the trellis diagram, the conduct of the ACS (ADD COMPARE SELECT) operations, and the traceback operation for the determination of a previous data symbol.

The Viterbi algorithm which has been developed in order to solve the present problem also includes the three computation procedures described above. However, the procedures for calculation of the branch metric values and of the ACS operations have been modified in comparison to conventional Viterbi algorithms.

In contrast to a conventional Viterbi algorithm, the calculation unit does not calculate the branch metric values at the times which are defined by the symbol clock, but at the times at which the received signal zero crossings occur. In this case, it should be noted that the time interval between two zero crossings is shorter than the symbol time period.

The calculation unit in consequence calculates branch metric values for at least two state transitions relating to the time $t_{i+1}$ for each filter state, each of which state transitions leads from a possible predecessor state for the time $t_i$ to the destination state under consideration for the time $t_{i+1}$. The calculated branch metric values are added to the already calculated branch metric values which lead to the respective predecessor state for the time $t_i$.

If the times $t_i$ and $t_{i+1}$ occur in the same symbol clock cycle, no state transition takes place in the trellis diagram. In consequence, only ADD operations, but no COMPARE or SELECT operations, are carried out in this case for the time $t_{i+1}$.

If there is a symbol clock cycle boundary between the times $t_i$ and $t_{i+1}$, that is to say if the times $t_i$ and $t_{i+1}$ do not occur in the same symbol clock cycle, that state transition which leads with the minimum accumulated branch metric from one of the possible predecessor nodes to the destination node under consideration located between the times $t_i$ and $t_{i+1}$ is determined for the nodes for the symbol clock cycle boundary under consideration in order to carry out a respective node transition. In consequence, ADD, COMPARE and SELECT operations are carried out for the time $t_{i+1}$ in this case.

The modified Viterbi algorithm which has been explained above can be used at the receiver end for simple demodulation of a frequency-modulated analog received signal to which noise has been added during transmission via the air interface.

According to one advantageous refinement of the invention, the sequence elements $z_i$ in the sequence $\{z_i\}$ are calculated from the time differences $t_{i+1}-t_i$, and the sequence elements $h_{i,k}$ in the coefficient sequences $\{h_{i,k}\}$ are derived from the times $t_i$ such that the following equation is satisfied:

$$z_i = \sum_{k=-\infty}^{\infty} d_k \cdot h_{i,k} \quad (1)$$

The sequence elements $z_i$ are preferably defined by:

$$z_i = 1 - \frac{2\omega_0}{\pi} \cdot (t_{i+1} - t_i) \quad (2)$$

In equation (2), $\omega_0$ indicates the carrier frequency of the unmodulated signal.

The coefficients $h_{i,k}$ are preferably defined by:

$$h_{i,k} = 2\eta \cdot [q(t_{i+1} - k \cdot T) - q(t_i - k \cdot T)] \quad (3)$$

In this case, $\eta$ is the modulation index, T is the symbol time period, and q(t) is the integral over the elementary pulse shape g(t).

The modulation index $\eta$ and the integral q(t) over the elementary pulse shape g(t) are defined by the following equations, where $\Delta\omega$ denotes the modulation shift:

$$\eta = \frac{\Delta\omega \cdot T}{\pi} \quad (4)$$

$$q(t) = \frac{1}{T} \int_{-\infty}^{t} g(\tau) d\tau \quad (5)$$

It is advantageous for the apparatus and the transmitter which is transmitting the frequency-modulated signal to have already been synchronized when the apparatus carries out the steps required for demodulation. For this purpose, the apparatus and the transmitter in particular have units for symbol synchronization.

The signal to be transmitted is preferably modulated at the transmitter end by means of the CPFSK (Continuous Phase Frequency Shift Keying) method.

The apparatus according to the invention can particularly advantageously be integrated in cordless digital communications systems which are designed for signal transmission over distances of only a few meters. In the case of short transmission paths such as these, the signal is mainly subject to interference from noise rather than by multipath interference. In particular, communications systems such as these may be based on the BLUETOOTH™ wireless technology Standard, the DECT Standard or the WDCT Standard.

The method according to the invention is used for demodulation of an analog received signal which is frequency-modulated at the transmitter end with a data symbol sequence $\{d_k\}$. In a first method step, zero crossings in the received signal are detected. In a second method step, a sequence $\{z_i\}$ is generated. A sequence element $z_i$ in the sequence $\{z_i\}$ is in this case based on a function of the difference $t_{i+1}-t_i$ between the times $t_i$ and $t_{i+1}$ associated with two successive zero crossings. In a third method step, the data symbol sequence $\{d_k\}$ is reconstructed. This is done by selecting from the possible data symbol sequences that data symbol sequence as the sought data symbol sequence $\{d_k\}$ for which the Euclidean distance between the sequence $\{z_i\}$ and a sequence calculated at the receiver end is a minimum. Each sequence element in the calculated sequence is formed from convolution of the data symbol sequence $\{d_k\}$ with a coefficient sequence $\{h_{i,k}\}$ for the index k. The coefficient sequences $\{h_{i,k}\}$ are obtained from the times $t_i$ and $t_{i+1}$.

The method according to the invention has the advantage that it allows particularly reliable and low complexity demodulation of the received signal.

BRIEF DESCRIPTION OF THE DRAWINGS

The invention will be explained in more detail in the following text, in an exemplary manner, with reference to the drawings, in which:

FIG. 1a shows an illustration of an unmodulated carrier oscillation;

FIG. 1b shows an illustration of a digitally frequency-modulated carrier oscillation;

FIG. 1c shows an illustration of the symbol clock cycles of the carrier oscillations from FIGS. 1a and 1b;

FIG. 1d shows an illustration of the method of operation of a detector for zero crossings.

DETAILED DESCRIPTION OF EMBODIMENTS OF THE INVENTION

Figure 2:
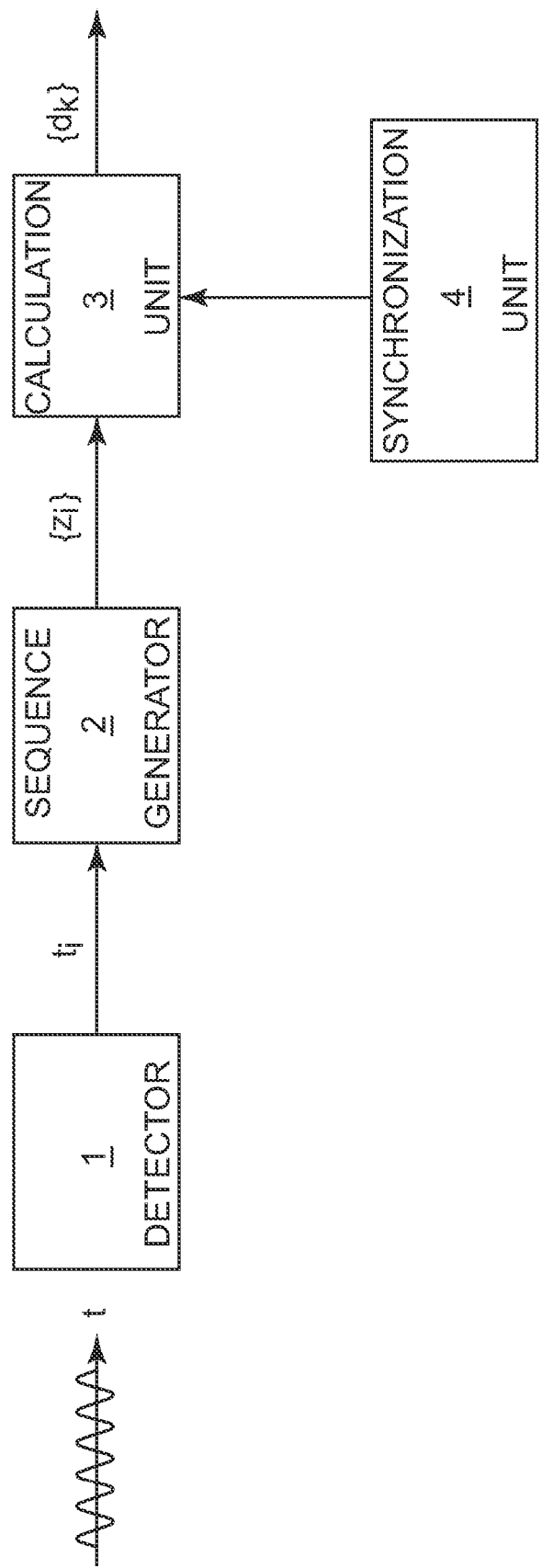
FIG. 2 shows a schematic illustration of one exemplary embodiment of the apparatus according to the invention.

FIG. 1a shows an unmodulated carrier oscillation. FIG. 1b shows the carrier oscillation as shown in FIG. 1a after frequency modulation. FIGS. 1a and 1b correspond to the upper part of FIG. 11.2.3 on page 385 of the book "Nachrichtenübertragung" [Information Transmission] by K. D. Kammeyer, which appeared in B. G. Teubner Verlag, Stuttgart, 2nd Edition, 1996.

The modulation type in the example shown in FIG. 1b is two stage discrete frequency modulation (FSK; Frequency Shift Keying), that is to say frequency shift keying between two defined frequencies on the basis of a two level data symbol. In the present example, a data symbol can assume the values −1 and 1. FIG. 1b shows four symbol clock cycles with a data symbol sequence [1 1 1 1]. Each symbol clock cycle has a symbol time period T. The symbol clock cycle boundaries are plotted against the time t in FIG. 1c.

In the present case, the carrier frequency is $\omega_0=2.5\cdot 2\cdot\pi/T$ and the modulation index is $\eta=1$. The oscillation phase has a continuous profile (CPFSK). If the data symbol changes at the symbol clock cycle boundaries, then a discrete sudden frequency change takes place. The present example relates to two level data symbols, to which the frequency $\omega_0-\Delta\omega$ is assigned for the value −1, and the frequency $\omega_0+\Delta\omega$ is assigned for the value 1. In most cases, the modulation is band limited, so that the sudden frequency changes are not in the form of a square wave, but are extended over time. One example of this is Gaussian Minimum Shift Keying (GMSK).

The following CPFSK signal model may be used as the basis for a frequency-modulated bandpass signal x(t) transmitted by a transmitter:

$$x(t)=Re\{s(t)\cdot e^{j\omega_0 t}\} \quad (6)$$

In this case, s(t) is the equivalent low pass signal:

$$s(t)=a\cdot e^{j\phi(t)} \quad (7)$$

The instantaneous phase $\phi(t)$ is calculated from the integral over the instantaneous frequency $\omega_i(t)$:

$$\phi(t) = \int_{-\infty}^{t} \omega_i(t')dt' \quad (8)$$

-continued $$\omega_i(t) = \Delta\omega \cdot \sum_{k=-\infty}^{\infty} d_k \cdot g(t-k\cdot T) \quad (9)$$

In equation (9), g(t) denotes the elementary pulse shape. For a GMSK signal or a GFSK (Gaussian Frequency Shift Keying) signal:

$$g(t) = \frac{1}{2}\left\{\text{erf}\left(\alpha\cdot\frac{t+\frac{T}{2}}{T}\right) - \text{erf}\left(\alpha\cdot\frac{t-\frac{T}{2}}{T}\right)\right\} \quad (10)$$

The function erf( ) represents the Gaussian error function.

The factor $\alpha$ depends on the time duration/bandwidth product:

$$\alpha = \sqrt{\frac{2}{\ln 2}}\cdot \pi\cdot f_{3dB}\cdot T \quad (11)$$

If one considers the equation for the modulation index $\eta$ $$\eta = \frac{\Delta\omega\cdot T}{\pi} \quad (12)$$

and the integral q(t) over the elementary pulse shape g(t):

$$q(t) = \frac{1}{T}\int_{-\infty}^{t} g(\tau)d\tau, \quad (13)$$

then the instantaneous phase $\Phi(t)$ becomes:

$$\phi(t) = \pi\eta\cdot\sum_{k=-\infty}^{\infty} d_k\cdot q(t-k\cdot T) \quad (14)$$

The elementary pulse shape g(t) is generally normalized such that the integral q(t), which is also referred to as the phase elementary pulse, has the limit value 1 after L symbol clock cycles. The so called influence length L indicates the number of symbol clock cycles over which the elementary pulse extends. In consequence:

$$q(t) = \begin{cases} 0 & \text{for } t \leq 0 \\ 1 & \text{for } t \geq L\cdot T \end{cases} \quad (15)$$

For a subsequent predetermined time interval:

$$l\cdot T \leq t < (l+1)\cdot T \quad (16)$$

then:

$$\phi(t) = \phi_1 + \pi\eta \cdot \sum_{k=1-L+1}^{1} d_k \cdot q(t - k \cdot T), \quad (17)$$

where $\Phi 1$ is defined as follows:

$$\phi_1 = \pi\eta \cdot \sum_{k=-\infty}^{1-L} d_k \cdot q(t - k \cdot T) \quad (18)$$

The principle of the present invention is based on measuring the zero crossings of the received signal by means of a zero crossing detector. In the CPFSK signal model described above, zero crossings in the quadrature components $\mathrm{Re}\{x(t)\}$ and $\mathrm{Im}\{x(t)\}$ occur at the times $t_i$ and $t_{i+1}$ (i=0, 1, 2, ...) when the following condition is satisfied:

$$\omega_0 \cdot t_i + \phi(t_i) = i \cdot \frac{\pi}{2} \quad (19)$$

FIG. 1*d* shows the zero crossings of the frequency-modulated carrier oscillation illustrated in FIG. 1*b*. In the example shown in FIG. 1, the symbol clock cycles which include the data symbol 1 each have six zero crossings, while symbol clock cycles which include the data symbol −1 each have four zero crossings. This means that the zero crossings do not always occur at equal time intervals. For demodulation purposes, the time intervals between the zero crossings can thus be determined and can be used for detection of the digital data symbols.

According to the invention, a sequence $\{z_i\}$ is calculated from the times $t_i$ and $t_{i+1}$ of the zero crossings for demodulation of the frequency-modulated received signal. Each sequence element $z_i$ in the sequence $\{z_i\}$ is in this case calculated from the difference $t_{i+1}-t_i$ between the times $t_i$ and $t_{i+1}$ of two successive zero crossings. The following signal model can be derived from the equations (6) to (19):

$$z_i = \sum_{k=-\infty}^{\infty} d_k \cdot h_{i,k} \quad (20)$$

In this case, the data symbol sequence $\{d_k\}$ indicates the sequence of the data symbols $d_k$ with which the carrier oscillation is frequency-modulated at the transmitter end. A sequence element $z_i$ is obtained, according to equation (20), from convolution of the data symbol sequence $\{d_k\}$ with a coefficient sequence $\{h_{i,k}\}$, with the index i being fixed for one convolution. The indexes i and k are in each case natural numbers.

The equation (20) on which the present signal model is based is satisfied when the coefficients $h_{i,k}$ and the sequence elements $z_i$ assume, by way of example, the following forms:

$$h_{i,k} = 2\eta \cdot [q(t_{i+1} - k \cdot T) - q(t_i - k \cdot T)] \quad (21)$$

-continued $$z_i = 1 - \frac{2\omega_0}{\pi} \cdot (t_{i+1} - t_i) \quad (22)$$

Since the elementary pulse shape g(t) has a compact carrier [0,L·T], the coefficients $h_{i,k}$ are limited with respect to the index k.

According to the model, the equations (20) to (22) can be interpreted in such a way that the sequence elements $z_i$ are each obtained by a filter operation from the data symbols $d_k$, with the coefficients $h_{i,k}$ being the filter coefficients. The coefficients $h_{i,k}$ are in this case not fixed, but vary with time.

If the bandpass signal x(t) is transmitted between the transmitter and receiver via the air interference without any interference, equation (20) is always satisfied. However, if the bandpass signal x(t) is subject to interference during transmission, then values which do not satisfy equation (20) result at the receiver end for the sequence elements $z_i$. In order nevertheless to make it possible to determine the transmitted data symbol sequence $\{d_k\}$, a minimization process is carried out in accordance with the following wall, in the sense of the least-squares criterion:

$$\left\| z_i - \sum_{k=-\infty}^{\infty} d_k \cdot h_{i,k} \right\|^2 = \sum_{i=-\infty}^{\infty} \left| z_i - \sum_{k=-\infty}^{\infty} d_k \cdot h_{i,k} \right|^2 \rightarrow \min \quad (23)$$

In consequence, it is necessary to find from the possible data symbol sequences that data symbol sequence $\{d_k\}$ for which the term (23) is a minimum.

The Viterbi algorithm is used in a modified form in order to efficiently solve this minimization problem. The nodes in the trellis diagram are in this case located at the symbol clock cycle boundaries. The branch metric values are, however, not calculated for the symbol clock cycle boundaries but for the times $t_i$. Only ADD operations are carried out for transitions between the times $t_i$ and $t_{i+1}$ for which both times $t_i$ and $t_{i+1}$ are within one symbol clock cycle, after calculation of the branch metric values. COMPARE and SELECT operations are carried out in addition to the ADD operations only when a symbol clock cycle boundary is passed over.

In FIG. 1*d*, the zero crossings of the frequency-modulated received signal as measured by the zero crossing detector are numbered for the first two symbol clock cycles. The procedure according to the invention can be understood on the basis of these zero crossings. Branch metric values are calculated for the times $t_2$ to $t_6$, and only ADD operations are then carried out, since the associated zero crossings are all within one symbol clock cycle. The symbol clock cycle boundary is not passed over between the first and the second symbol clock cycle until the transition to the time $t_7$. In consequence, branch metric values are calculated, ADD, COMPARE and SELECT operations are carried out, for the time $t_7$. Branch metric values are calculated, and then only ADD operations are carried out, for the times $t_8$ to $t_{10}$.

FIG. 2 shows a schematic illustration of one exemplary embodiment of the apparatus according to the invention. A detector 1, a sequence generator 2 and a calculation unit 3 are connected in series in the stated sequence. The detector 1 is fed with a frequency-modulated received signal and detects the times $t_i$ and $t_{i+1}$ of the zero crossings in the received signal. The sequence generator 2 generates the sequence $\{z_i\}$ from the times $t_i$ and $t_{i+1}$, from which the calculation unit 3 reconstructs (by means of the modified Viterbi algorithm as described above) the data symbol sequence $\{d_k\}$ which has been used at the transmitter end for modulation of the transmission signal. A synchronization unit 4 provides symbol synchronization.

What we claim is:

1. An apparatus for demodulation of an analog received signal which is frequency-modulated at the transmitter end with a data symbol sequence $\{d_k\}$, said apparatus comprising:
  a detector for zero crossings of the received signal,
  a sequence generator for production of a sequence $\{z_i\}$, with a sequence element $z_i$ being a function of the difference between the times $t_i$ and $t_{i+1}$ associated with two successive zero crossings, and
  a calculation unit for reconstruction of the data symbol sequence $\{d_k\}$, with that data symbol sequence being chosen from the possible data symbol sequences as the sought data symbol sequence $\{d_k\}$ for which the Euclidean distance between the sequence $\{z_i\}$ and a sequence which is calculated at the receiver end is a minimum, with each sequence element in the calculated sequence being formed from a convolution of the data symbol sequence $\{d_k\}$ with a coefficient sequence $\{h_{i,k}\}$ for the index k, wherein the coefficient sequences $\{h_{i,k}\}$ are obtained from the times $t_i$ and $t_{i+1}$, wherein the sequence elements $h_{i,k}$ in the coefficient sequences $\{h_{i,k}\}$ are defined in such a way that $$z_i = \sum_{k=-\infty}^{\infty} d_k \cdot h_{i,k}$$

wherein the sequence elements $z_i$ are given by the function $$z_i = 1 - \frac{2\omega_0}{\pi} \cdot (t_{i+1} - t_i)$$

where $\omega_0$ is the carrier frequency of the unmodulated signal,
  in that the coefficients $h_{i,k}$ are given by the function $h_{i,k}=2\eta \cdot [q(t_{i+1}-k\cdot T)-q(t_i-k\cdot T)]$ where $\eta$ is the modulation index, T is the symbol time duration and q(t) is the integral over the elementary pulse shape g(t), and
  the modulation index ii is given by $$\eta = \frac{\Delta\omega \cdot T}{\pi}$$

and the integral q(t) over the elementary pulse shape g(t) is given by $$q(t) = \frac{1}{T} \int_{-\infty}^{t} g(\tau) d\tau,$$

where $\Delta\omega$ is the modulation shift.

2. An apparatus according to claim 1, wherein the apparatus and the transmitter which transmits the frequency-modulated signal are synchronized and, in particular, have units for symbol synchronization.

3. An apparatus according to claim 1, wherein the frequency-modulated received signal is a CPFSK signal.

4. A cordless digital communications system based on the BLUETOOTH™ wireless technology Standard, the DECT Standard or the WDCT Standard, having an apparatus according to claim 1.

5. An apparatus for demodulation of an analog received signal which is frequency-modulated at the transmitter end with a data symbol sequence $\{d_k\}$, said apparatus comprising:
  a detector for zero crossings of the received signal,
  a sequence generator for production of a sequence $\{z_i\}$, with a sequence element $z_i$ being a function of the difference between the times $t_i$ and $t_{i+1}$ associated with two successive zero crossings, and
  a calculation unit for reconstruction of the data symbol sequence $\{d_k\}$, with that data symbol sequence being chosen from the possible data symbol sequences as the sought data symbol sequence $\{d_k\}$ for which the Euclidean distance between the sequence $\{z_i\}$ and a sequence which is calculated at the receiver end is a minimum, with each sequence element in the calculated sequence being formed from a convolution of the data symbol sequence $\{d_k\}$ with a coefficient sequence $\{h_{i,k}\}$ for the index k, wherein the coefficient sequences $\{h_{i,k}\}$ are obtained from the times $t_1$ and $t_{i+1}$, wherein a Viterbi algorithm is implemented in the calculation unit, wherein the frequency modulation of the analog received signal with the data symbol sequence $\{d_k\}$ is understood as the data symbol sequence $\{d_k\}$ being fed into a filter in which the coefficients $h_{i,k}$ are present, and which generates an equivalent sequence to the sequence $\{z_i\}$ on the output side by convolutions of the data symbol sequence $\{d_k\}$ with the coefficient sequences $\{h_{i,k}\}$, wherein the calculation unit includes a trellis diagram whose nodes represent the filter states, with nodes located vertically one above the other in the trellis diagram relating to a same symbol clock cycle boundary,
  the calculation unit calculates transmission metric values, and carries out ADD operations but no COMPARE or SELECT operations for the time $t_{i+1}$ when the times $t_i$ and $t_{i+1}$ are in the same symbol clock cycle, and
  the calculation unit calculates transmission metric values and carries out ADD, COMPARE and SELECT operations at the time $t_{i+1}$ when a symbol clock cycle boundary is crossed between the time $t_i$ and the time $t_{i+1}$.

6. A method for demodulation of an analog received signal which is frequency-modulated at the transmitter end with a data symbol sequence $\{d_k\}$, said method comprising:
  (a) detection of zero crossings in the received signal;
  (b) generation of a sequence $\{z_i\}$, with a sequence element $z_i$ being a function of the difference between the times $t_i$ and $t_{i+1}$ associated with two successive zero crossings, and
  (c) reconstruction of the data symbol sequence $\{d_k\}$ with a Viterbi algorithm, with that data symbol sequence being chosen from the possible data symbol sequences as the sought data symbol sequence $\{d_k\}$ for which the Euclidean distance between the sequence $\{z_i\}$ and a sequence which is calculated at the receiver end is a minimum, with each sequence element in the calculated sequence being formed from a convolution of the data symbol sequence $\{d_k\}$ with a coefficient sequence $\{h_{i,k}\}$ for the index k, wherein the coefficient sequences $\{h_{i,k}\}$ are obtained from the times $t_i$ and $t_{i+1}$, wherein the frequency modulation of the analog received signal with the data symbol sequence $\{d_k\}$ is understood as the data symbol sequence $\{d_k\}$ being fed into a filter in which the coefficients $h_{i,k}$ are present, and which generates an equivalent sequence to the sequence $\{z_i\}$ on the output side by convolutions of the data symbol sequence $\{d_k\}$ with the coefficient sequences $\{h_{i,k}\}$, wherein a trellis diagram whose nodes represent the filter states is used for reconstruction of the data symbol sequence $\{d_k\}$, said nodes located vertically one above the other in the trellis diagram relating to a same symbol clock cycle boundary, branch metric values are calculated and ADD operations are carried out, but not COMPARE or SELECT operations, for the time $t_{i+1}$ when the times $t_i$ and $t_{i+1}$ are in the same symbol clock cycle, and branch metric values are calculated and ADD, COMPARE and SELECT operations are carried out for the time $t_{i+1}$ when a symbol clock cycle boundary is crossed between the time $t_i$ and the time $t_{i+1}$.

7. A method according to claim 6, wherein before carrying out the method steps (a) to (c), the transmitter which is transmitting the frequency-modulated signal and the receiver which is receiving the frequency-modulated signal are synchronized.

8. A method according to claim 6, wherein the frequency-modulated received signal is a CPFSK signal.

9. A method for demodulation of an analog received signal which is frequency-modulated at the transmitter end with a data symbol sequence $\{d_k\}$, said method comprising:
(a) detection of zero crossings in the received signal;
(b) generation of a sequence $\{z_i\}$, with a sequence element $z_i$ being a function of the difference between the times $t_i$ and $t_{i+1}$ associated with two successive zero crossings, and
(c) reconstruction of the data symbol sequence $\{d_k\}$, with that data symbol sequence being chosen from the possible data symbol sequences as the sought data symbol sequence $\{d_k\}$ for which the Euclidean distance between the sequence $\{z_i\}$ and a sequence which is calculated at the receiver end is a minimum, with each sequence element in the calculated sequence being formed from a convolution of the data symbol sequence $\{d_k\}$ with a coefficient sequence $\{h_{i,k}\}$ for the index k, wherein the coefficient sequences $\{h_{i,k}\}$ are obtained from the times $t_i$ and $t_{i+1}$, wherein the sequence elements $h_{i,k}$ in the coefficient sequences $\{h_{i,k}\}$ are defined in such a way that $$z_i = \sum_{k=-\infty}^{\infty} d_k \cdot h_{i,k},$$

wherein the sequence elements $z_i$ are given by the function $$z_i = 1 - \frac{2\omega_0}{\pi} \cdot (t_{i+1} - t_i)$$

where $\omega_0$ the carrier frequency of the unmodulated signal,
the coefficients $h_{i,k}$ are given by the function $h_{i,k}=2\eta \cdot [q(t_{i+1}-k \cdot T)-q(t_i-k \cdot T)]$ where $\eta$ is the modulation index, T is the symbol time duration, q(t) is the integral over the elementary pulse shape g(t), and
the modulation index $\eta$ is given by $$\eta = \frac{\Delta \omega \cdot T}{\pi},$$

the integral q(t) over the elementary pulse shape g(t) is given by $$Q(t) = \frac{1}{T}\int_{-\infty}^{t} g(\tau)d\tau,$$

wherein $\Delta\omega$ is the modulation shift.

* * * * *